United States Patent Office 3,444,173
Patented May 13, 1969

3,444,173
SUBSTITUTED 8-HYDROXY-QUINOLINE
DERIVATIVES
Irving M. Goldman, Niantic, Conn., assignor to Chas.
Pfizer & Co., Inc., New York, N.Y., a corporation of
Delaware
No Drawing. Continuation-in-part of two applications Ser.
No. 438,735, Mar. 10, 1965, and Ser. No. 496,158, Oct.
14, 1965. This application May 12, 1966, Ser. No.
549,485
Int. Cl. C07d 33/52, 33/44; A61k 27/00
U.S. Cl. 260—288
14 Claims

ABSTRACT OF THE DISCLOSURE

1-[5-(8-hydroxyquinolyl)]-2-aminoethanol compounds, the corresponding 1,2,3,4-tetrahydro compounds and acid addition salts thereof useful as bronchodilators.

This is a continuation-in-part of application Ser. No. 496,158 filed Oct. 14, 1965 and now abandoned, said latter application being in turn a continuation-in-part of application Ser. No. 438,735 as filed Mar. 10, 1965, and now abandoned.

This invention relates to novel substituted 8-hydroxyquinoline derivatives having valuable therapeutic activity. More particularly, this invention relates to 1-[5-(8-hydroxyquinolyl)]-2-aminoethanol compounds and the corresponding 1,2,3,4-tetrahydro derivatives thereof having the following structural formulae:

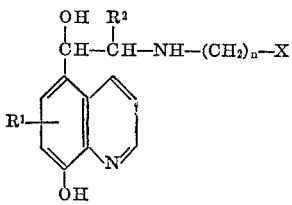

and

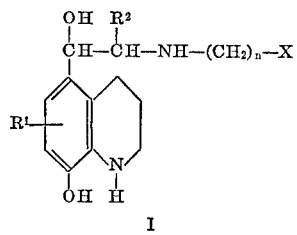

I wherein R' is a member selected from the group consisting of H, alkyl of from 1 to 5 carbon atoms, halogen (F, Cl, Br, I), hydroxy, methoxy, mercapto, amino, —SO₃H, and methanesulfonalyamino; R² is selected from the group consisting of H, methyl and ethyl; $n$ is an integer of from 0 to 10; and X is a member selected from the group consisting of H, phenyl, p-chlorophenyl, p-methoxyphenyl, phenoxy, p-chlorophenoxy, p-methoxyphenoxy, N-pyrrolidino, N-morpholino, N-(N'-methyl)-piperazino, β-indolyl, 3,4-methylenedioxyphenyl and cycloalkyl containing from 3 to 7 carbon atoms provided that when $n$ is 0, X is always hydrogen. When $n$ is an integer greater than one, it is meant to include alkylene which is branched as well as straight-chained. For instance, when $n$ is four, and X is hydrogen, the possible derivatives contemplated by this invention include: n-butyl, isobutyl, α-methylpropyl and t-butyl.

Advantageous compounds of this invention are represented by the following structural formulae:

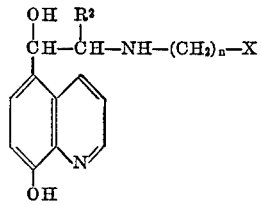

and

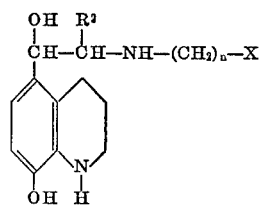

II wherein R² is selected from the group consisting of H, methyl and ethyl; $n$ is an integer of from 0 to 10 and X is a member selected from the group consisting of H, phenyl, p-chrolophenyl, p-methoxyphenyl, phenoxy, p-chlorophenoxy, p-methoxyphenoxy, N-pyrrolidino, N-morpholino, N-(N'-methyl)piperazino, β-indolyl, 3,4-methylenedioxyphenyl and cycloalkyl containing from 3 to 7 carbon atoms provided that when $n$ is 0, X is always hydrogen.

This invention also includes the pharmaceutically-acceptable acid addition salts of the above defined bases formed with nontoxic organic and inorganic acids. Such salts are easily prepared by methods known to the art. The base is reacted with a substantially equivalent amount of a chosen acid in an aqueous solution or in a suitable organic solvent such as methanol or ethanol. When such salts are to be used for human consumption, either orally or parenterally, the acids which are used to prepare the pharmaceutically-acceptable acid addition salts must, of course, be those which necessarily form nontoxic acid addition salts. Exemplary of such organc salts are those with maleic, fumaric, benzoic, ascorbic, pamoic, succinic, methane-sulfonic, acetic propionic, tartaric, salicylic, citric, gluconic, lactic, malic, aspartic, itaconic and glutamic acids. Exemplary of such inorganic salts are those with hydrochloric, hydrobromic, sulfuric, sulfamic, phosphoric and nitric acids.

The novel compounds of this invention are particularly useful as bronchodilators for the treatment of bronchial asthma, bronchitis and emphysema. Furthermore, the above compounds offer distinct and unexpected advantages over other commonly used bronchodilators. Specifically, their duration of effect is extended over a longer period of time when compared with typical bronchodilators. Further, it is quite surprising to find that the compounds dsclosed herein may be administered orally without a loss in potency. These advantages clearly accentuate the therapeutic value of the compounds of this invention. In this connection, it was further discovered that side effects of the prior art compounds, such as direct cardiac stimulation and tachyphylaxis are markedly diminished.

It is an object of this invention therefore to provide such new and novel compounds. A further object is to provide a method of effecting bronchodilator action which comprises the administration of the herein disclosed compounds. Further objects will become evident from the ensuing detailed description of the invention.

The preparation of the compounds encompassed by Formulas I and II is readily effected by reacting 5-chloroacetyl-8-hydroxyquinoline or an appropriately substituted derivative thereof with a primary amine to produce an intermediate aminoacetyl-8-hydroxyquinoline derivative. The intermediate so obtained is then reduced by a sodium borohydride reduction to yield the corresponding 1-[5-(8-hydroxyquinolyl)]-2-aminoethanol compound. Reduction of said 1-[5-(8-hydroxyquinolyl)]-2-aminoethanol compound to the corresponding 1,2,3,4-tetrahydro derivative can be achieved by means of a catalytic hydrogenation step in which a platinum oxide catalyst is used. The over-all process comprising the aforementioned steps can be shown as follows:

dihydrochloride salt, is treated with sodium borohydride in one-half molar excess, and stirred at ice-bath temperatures for 15 minutes whereupon conc. HCl is added, then to complete precipitation, and the salts are filtered. The filtered salts are dissolved in water and converted to the free base by the addition of NaOH solution. After extraction and evaporation, the oil is crystallized from a suitable solvent, for example, ethyl acetate.

The 1-[5-(8-hydroxyquinolyl)]-2-aminoethanols may be reduced to their corresponding 1,2,3,4-tetrahydro derivatives by a hydrogenation process, i.e., step C, in

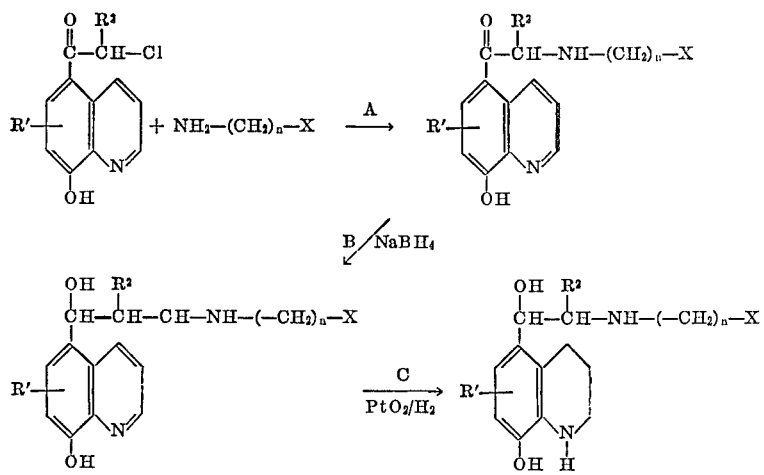

wherein R', R², A and $n$ are as defined earlier. Examples of appropriately substituted 5-acetyl-8-hydroxyquinoline derivatives are:

5-α-chloroacetyl-8-hydroxyquinoline,
5-α-chloropropionyl-8-hydroxyquinoline,
5-α-chloroacetyl-6-methyl-8-hydroxyquinoline,
5-α-chloropropionyl-6-methoxy-8-hydroxyquinoline, and
5-α-chloroacetyl-7-hydroxy-8-hydroxyquinoline.

Specific examples of the type of primary amine designated by the above general formula are: methylamine, ethylamine, t-butylamine, isopropylamine, cyclopropylamine, phenoxyisopropylamine, β-indolylisopropylamine, α-furanoisopropylamine, 1-(p-methoxyphenyl) ethylamine, and 2-(N-pyrrolidino)ethylamine. The starting materials, i.e., the 8-hydroxyquinoline derivatives and primary amines (including ammonia) are either known compounds or can be synthesized by any number of suitable synthetic procedures well known to those skilled in the art. For instance, 5-α-chloroacetyl-8-hydroxyquinoline is prepared by condensing 8-hydroxyquinoline with chloroacetyl chloride under appropriate conditions. Similarly, a ring-substituted 8-hydroxyquinoline derivative can be reacted with chloroacetyl chloride or α-chloropropionyl chloride to provide the corresponding 8-hydroxyquinoline derivatives.

Generally, reaction step A of Formula III, i.e., the reaction of an 8-hydroxyquinoline derivative with a suitable primary amine is carried out in the following way: To an ethanolic solution containing the amine in excess is added the 8-hydroxyquinoline compound and the resulting mixture is permitted to stand for periods up to 3 days. After this time period, the excess amine is removed and the product is isolated as the mono- or dihydrochloride addition salt.

The products obtained by reaction step A, i.e., aminoacetyl-8-hydroxyquinoline derivatives, can be reduced simply by means of sodium borohydride, i.e., step B. The conditions employed for the sodium borohydride method are those generally used for such a reduction. For example, a cold methanolic solution containing the aminoacetyl-8-hydroxyquinoline compound in the form of its which the catalyst most preferred is platinum oxide. It specifically reduces the pyridine ring of the molecule to the tetrahydro derivative. In general, the reaction is carried out in the following manner: a mixture containing the 1-[5-(8-hydroxyquinolyl)]-2-aminoethanol compound, platinum oxide catalyst, and 10% acetic acid in ethanol is hydrogenated until hydrogen uptake subsides. The resulting reaction mixture is filtered, evaporated to dryness, and the product crystallized as the appropriate acid addition salt.

The compounds encompassed by Formulae I and II can be administered either alone or preferably in combination with a pharmaceutically-acceptable carrier. They may be combined with various pharmaceutically-acceptable inert carriers in the form of tablets, capsules, lozenges, troches, hard candies, powders, sprays, aqueous suspensions, or solutions, injectable solutions, elixirs, syrups, and the like. Such carriers include solid diluents, or filters, sterile aqueous media and various nontoxic organic solvents. Moreover, the oral pharmaceutical compositions of this invention may be suitably sweetened and flavored by means of various agents of the type commonly employed for just such a purpose.

For purposes of parenteral administration, and inhalation, solutions or suspensions of the herein described compounds in sesame or peanut oil or in aqueous propylene glycol solutions can be employed, as well as sterile aqueous solutions of the corresponding water-soluble addition salts previously enumerated. These particular solutions are especially suited for intramuscular and subcutaneous injection purposes. The aqueous solutions, including those of the addition salts dissolved in pure distilled water, are additionally useful for intravenous injection purposes provided that their pH be properly adjusted before hand. Such solutions should also be suitably buffered, if necessary, and the liquid diluent first rendered isotonic with sufficient saline or glucose.

For oral administration of the therapeutic agents of this invention, tablets or capsules containing as high as 25 to 50 mg. may be taken once or twice a day for most applications. However, in most instances a maximum total dose of less than 1.0 mg. and generally even less than 0.5 mg. per day will suffice. On a body-weight basis, the preferred dosage level is generally from about 0.001 to about 0.014 mg./kg. per day. When administered by means of a spray formulated as a 1% solution, utilization once or twice a day is preferred.

The physician will determine the dosage which will be most suitable for an individual patient and it will vary with the age, the weight and response of the particular patient. The above dosages are exemplary of the average host. There can, of course, be individual cases where higher or lower dosage ranges are merited, and such are within the scope of this invention.

The principal use of bronchodilators is in the symptomatic treatment of asthma and other respiratory disorders such as chronic bronchitis and emphysema. This disclosure indicates that the compounds of this invention are effective bronchodilators with long duration of action. The compounds of the present invention were tested for their ability to antagonize the broncho-constrictor effects of acetylcholine and histamine in intact guinea pigs in the following manner; guinea pigs anesthetized with sodium phenobarbitol were treated with the test compound at dosage levels from 0.1 to 1000 μg./kg. diluted with 0.9% saline by means of intravenous injection, and the reduction in the increase in airway resistance caused by histamine or acetylcholine was measured. Comparison was made with isoproterenol, one of the most effective bronchodilators in use today. In addition, the compounds disclosed herein were tested for their ability to antagonize histamine aerosol-induced bronchoconstriction in intact conscious guinea pigs by the following method: guinea pigs were tested with the test compounds diluted with saline solution at dosage levels ranging from 0.25 to 2 mg./kg. subcutaneously, 0.5 to 2 mg./kg. orally or 0.5 to 2 mg./kg. by spray, one hour and 20 minutes prior to the histamine spray and antagonism to the bronchoconstrictor effects of histamine was measured.

The following examples are provided by way of illustration and should not be interpreted as limiting the invention, many variations of which are possible without departing from the spirit or scope thereof.

EXAMPLE I 5-isopropylaminoacetyl-8-hydroxyquinoline

To a stirred solution of 300 ml. of isopropylamine in 300 ml. ethanol is added 5-chloroacetyl-8-hydroxyquinoline (60.0 g., 0.27 M). After standing overnight, approximately 10 volumes of ether is added to complete the precipitation of the crude monohydrochloride of 5-isopropylaminoacetyl-8-hydroxyquinoline which is then filtered. This crude monohydrochloride is then dissolved in a minimum amount of hot ethanol and an equivalent of conc. HCl is added slowly with stirring. After cooling, the yellow precipitate is filtered and dried to give 70.0 g. (82%) of 5-isopropylaminoacetyl-8-hydroxyquinoline dihydrochloride.

Analysis.—Calc'd for $C_{14}H_{16}O_2N_2 \cdot 2HCl$: C, 53.10%; H, 5.72%. Found: C, 53.02%; H, 6.02%.

EXAMPLE II

5-α-isopropylaminopropionyl-8-hydroxyquinoline

The procedure of Example I is repeated for the preparation of 5-α-isopropylaminopropionyl-8-hydroxyquinoline, isolated as its dihydrochloride salt, wherein a stoichiometric equivalent amount of 5-α-chloropropionyl-8-hydroxyquinoline is used in place of 5-chloroacetyl-8-hydroxyquinoline with comparable results.

EXAMPLE III 5-isopropylaminoacetyl-7-chloro-8-hydroxyquinoline

The procedure of Example I is repeated for the preparation of 5-isopropylaminoacetyl-7-chloro-8-hydroxyquinoline, isolated as its dihydrochloride salt, wherein a stoichiometric equivalent amount of 5-chloroacetyl-7-chloro-8-hydroxyquinoline is used in place of 5-chloroacetyl-8-hydroxyquinoline with comparable results.

EXAMPLE IV 5-aminoacetyl-8-hydroxyquinoline

To boiling ethanol (200 ml.) is added 5-chloroacetyl-8-hydroxyquinoline (2.0 g.). Concentrated aqueous ammonia (800 ml.) is then added in four 200 ml. portions over a 30 min. period. The resulting dark solution is cooled and the solvent removed in vacuo. The yellow crystalline hydrochloride is dissolved in 10 ml. of warm water and 6 ml. conc. HCl added to form the dihydrochloride salt. The product is precipitated by the addition of 100 ml. ethanol and 250 ml. ether. Recrystallization affords 5-aminoacetyl-8-hydroxyquinoline dihydrochloride in 90% yield, M.P. 247° C. dec.

EXAMPLE V 5-ethylaminoacetyl-8-hydroxyquinoline

To a stirred solution of 75 ml. of 33% aqueous ethylamine is added 5-chloroacetyl-8-hydroxyquinoline (15 g., 0.07 M). After stirring overnight, the precipitate which forms, i.e., the crude monohydrochloride salt, is filtered and converted to the dihydrochloride salt by treating with an equivalent amount of HCl in ethanol. The crystalline precipitate is filtered and dried to give substantial yields of 5-ethylaminoacetyl-8-hydroxyquinoline dihydrochloride.

EXAMPLE VI 5-t-butylaminoacetyl-8-hydroxyquinoline

To a stirred ethanolic solution containing 5-butylamine (in excess) is added 5-chloroacetyl-8-hydroxyquinoline. After standing overnight, the excess amine and solvent are removed in vacuo. The residue is taken up in ethanol and converted to the dihydrochloride acid addition salt by treating with an equivalent amount of hydrochloric acid.

EXAMPLE VII 5-cyclopentylaminoacetyl-8-hydroxyquinoline

The procedure of Example VI is repeated for the preparation of 5-cyclopentylaminoacetyl-8-hydroxyquinoline, isolated as its dihydrochloride salt, wherein cyclopentylamine is used in lieu of t-butylamine with comparable results.

EXAMPLE VIII 5-(2-p-methoxyphenyl)ethylaminoacetyl-8-hydroxyquinoline

To a stirred ethanolic solution containing 2-p-methoxyphenylethylamine (in excess) is added 5-chloroacetyl-8-hydroxyquinoline. The resulting mixture is refluxed for 3 hours, cooled, evaporated almost to dryness, and the precipitate, i.e., monohydrochloride salt, is filtered. This monohydrochloride salt is dissolved in an ether-ethanol mixture and converted to the dihydrochloride acid addition salt by treating with an equivalent of conc. HCl. The crystalline product is filtered and dried to give a substantial yield of material.

EXAMPLE IX 5-(2-phenoxy)isopropylaminoacetyl-8-hydroxyquinoline

The procedure of Example VIII is repeated for the preparation of 5-(2-phenoxy)isopropylaminoacetyl-8-hydroxyquinoline, isolated as its dihydrochloride salt, wherein 2-phenoxyisopropylamine is used in lieu of 2-p-methoxyphenylethylamine with comparable results.

EXAMPLE X

5-(4-phenyl-2-butyl)-aminoacetyl-8-hydroxyquinoline

The procedure of Example VII is repeated for the preparation of 5-(4-phenyl-2-butyl)-aminoacetyl-8-hydroxyquinoline, isolated as its dihydrochloride salt, wherein 4-phenyl-2-butylamine is used in lieu of 2-p-methoxyphenylethylamine with comparable results.

EXAMPLE XI

The products cited below are prepared following the procedure of Example I wherein equivalent amounts of appropriate 8-hydroxyquine derivative and amine are used, and substantially the same results are obtained.

| 8-hydroxyquinoline Derivative | Amine | Product |
|---|---|---|
| 5-α-chloroacetyl-8-hydroxyquinoline | 2-butylamine | 5-α-(2-butylamino)acetyl-8-hydroxyquinoline. |
| Do | Methylamine | 5-methylaminoacetyl-8-hydroxyquinoline. |
| Do | 2-methyl-1-ethylamine | 5-α-(2-methyl-1-butylamino acetyl-8-hydroxyquinoline. |
| Do | 1-methyl-2-phenoxyethylamine | 5-α-(1-methyl-2-phenoxyethylamino)acetyl-8-hydroxyquinoline. |
| Do | 5-(N-morpholino)pentylamine | 5-α-[5-(N-morpholino)-pentylamino]acetyl-8-hydroxyquinoline. |
| Do | 1-methyl-3-(N-morpholino)propylamine | 5-α-[1-methyl-3-(N-morpholino)propylamino]acetyl-8-hydroxyquinoline. |
| 5-α-chloropropionyl-6-mercapto-8-hydroxyquinoline. | Nonylamine | 5-α-nonylaminopropionyl-6-mercapto-8-hydroxyquinoline. |
| 5-α-chloropropionyl-6-hydroxy-8-hydroxyquinoline. | 3-(phenoxy)propylamine | 5-α-[3-(phenoxy)propylamino]propionyl-6-hydroxy-8-hydroxyquinoline. |
| 5-α-chloropropionyl-7-propyl-8-hydroxyquinoline | 2-(N-morpholino)isopropylamine | 5-α-[2-(N-morpholino)isopropylamino]propionyl-7-propyl-8-hydroxyquinoline. |
| 5-α-chloropropionyl-7-bromo-8-hydroxyquinoline | Isopropylamine | 5-α-isopropylaminopropionyl-7-chloro-8-hydroxyquinoline. |
| Do | 3-methylhexylamine | 5-α-(3-methyl-hexylamino)propionyl-7-bromo-8-hydroxyquinoline. |
| 5-α-chloropropionyl-7-fluoro-8-hydroxyquinoline | Octylamine | 5-α-octylaminopropionyl-7-fluoro-8-hydroxyquinoline. |
| 5-α-chloropropionyl-7-amino-8-hydroxyquinoline | p-Chloro- | 5-α-(p-chlorobenzylamino)propionyl-7-amino-8-hydroxyquinoline. |
| 5-α-chlorobutyryl-8-hydroxyquinoline | Methylamine | 5-methylamino-butryryl-8-hydroxyquinoline. |
| Do | Benzylamine | 5-α-benzylamino-butyryl-8-hydroxyquinoline. |
| 5-α-chlorobutyryl-7-ethyl-8-hydroxyquinoline | Cyclohexylamine | 5-α-cyclohexylamino butyryl-7-ethyl-8-hydroxyquinoline. |
| 5-α-chlorobutyryl-6-bromo-8-hydroxyquinoline | 4-(α-furano)butylamine | 5-α-[4-(α-furano)butylamino]butyryl-6-bromo-8-hydroxyquinoline. |
| 5-α-chlorobutryrl-7-amino-8-hydroxyquinoline | β-Indolysisopropylamine | 5-α-(β-indolylisopropylamino)butyryl-7-amino-8-hydroxyquinoline. |
| 5-α-chloroacetyl-6-bromo-8-hydroxyquinoline | 1-(p-methoxyphenoxy)ethylamine | 5-α-[1-(p-methoxyphenoxy)ethylamino]acetyl-6-bromo-8-hydroxyquinoline. |
| 5-α-chloroacetyl-6-methoxy-8-hydroxyquinoline | 4-(α-furano)-butylamine | 5-α-[4-(α-furano)butylamino]acetyl-6-methoxy-8-hydroxyquinoline. |
| 5-α-chloroacetyl-7-amino-8-hydroxyquinoline | Isoamylamine | 5-α-isoamylaminoacetyl-7-amino-8-hydroxyquinoline. |
| 5-α-chloroacetyl-7-methanesulfonylamino-8 hydroxyquinoline. | 1-methyl-3-(β-indolyl)propylamine | 5-α-[1-methyl-3-(β-indolyl)propylamino]acetyl-7-methanesulfonylamino-8-hydroxyquinoline. |
| 5-α-chloroacetyl-7-ethyl-8-hydroxyquinoline | 5-(N-pyrrolidino)pentylamine | 5-α-[5-(N-pyrrolidino)-pentylamino]acetyl-7-ethyl-8-hydroxyquinoline. |
| 5-α-chloroacetyl-7-butyl-8-hydroxyquinoline | 2,5-diethylhexylamine | 5-α-(2,5-diethyl-hexylamino)acetyl-7-butyl-8-hydroxyquinoline. |
| 5-α-chloroacetyl-7-mercapto-8-hydroxyquinoline | Cyclohexylamine | 5-α-cyclohexylaminoacetyl-7-mercapto-8-hydroxyquinoline. |
| 5-α-chloroacetyl-7-SO₃H-8-hydroxyquinoline | Benzylamine | 5-α-benzylamino-acetyl-7-SO₃H-8-hydroxyquinoline. |
| 5-α-chloroacetyl-6-hydroxy-8-hydroxyquinoline | Cyclopropylmethylamine | 5-α-cyclopropylmethylaminoacetyl-6-hydroxy-8-hydroxyquinoline. |
| 5-α-chloropropionyl-7-propyl-8-hydroxyquinolin | t-Butylamine | 5-α-(t-butylamino)propionyl-7-propyl-8-hydroxyquinoline. |
| 5-α-chloropropionyl-6-chloro-8-hydroxyquinoline | 2-(p-methoxyphenoxy)ethylamine | 5-α-[2-(p-methoxyphenoxy)ethylamino]propionyl-6-chloro-8-hydroxyquinoline. |
| 5-α-chloropropionyl-7-iodo-8-hydroxyquinoline | 1-methyl-4-(p-chlorophenyl)butylamine | 5-α-[1-methyl-4-(p-chlorophenoxy)butylamino]propionyl-7-iodo-8-hydroxyquinoline. |
| 5-α-chloroacetyl-8-hydroxyquinoline | 6-(β-indolyl)hexylamine | 5-α-[6-(β-indolyl)hexylamino]acetyl-8-hydroxyquinoline. |
| Do | β-Indolylisopropylamine | 5-α-(β-indolylisopropylamino)acetyl-8-hydroxyquinoline. |
| Do | α-Furanoisopropylamine | 5-α-(α-furanoisopropylamino)acetyl-8-hydroxyquinoline. |
| Do | 7-cyclohexylheptylamine | 5-α-(7-cyclohexylheptylamino)acetyl-8-hydroxyquinoline. |
| Do | 8-(3,4-methylenedioxyphenyl)octylamine | 5-α-[8-(3,4-methylenedioxyphenyl)-octylamino]-acetyl-8-hydroxyquinoline. |
| Do | 2-ethyl-4-methylpentylamine | 5-α-(2-ethyl-4-methylpentylamino)acetyl-8-hydroxyquinoline. |
| 5-α-chloropropionyl-8-hydroxyquinoline | 3-(α-furano)propylamine | 5-α-[3-(α-furano)propylamino]propionyl-8-hydroxyquinoline. |
| Do | 1-methyl-2-(p-methoxyphenoxy)ethylamine | 5-α-[1-methyl-2-(p-methoxyphenoxy)ethylamino]propionyl-8-hydroxyquinoline. |
| Do | 1-ethyl-2-(N-pyrrolidino)ethylamine | 5-α-[1-ethyl-2-(N-pyrrolidino)ethylamino]-propionyl-8-hydroxyquinoline. |
| Do | 1-methyl-3-[N-(N'-methyl)piperazino]propylamine | 5-α-1-methyl-3-[N-(N'-methyl)piperazino]-propylaminopropionyl-8-hydroxyquinoline. |
| Do | 9-(p-methoxyphenyl)nonylamine | 5-α-[9-(p-methoxyphenyl)nonylamino]propionyl-8-hydroxyquinoline. |
| 5-α-chloroacetyl-7-methyl-8-hydroxyquinoline | Isobutylamine | 5-α-isobutylaminoacetyl-7-methyl-8-hydroxyquinoline. |
| 5-α-chloroacetyl-7-pentyl-8-hydroxyquinoline | 2-(p-chlorophenyl)ethylamine | 5-α-[2-(p-chlorophenyl)ethylamino]acetyl-7-pentyl-8-hydroxyquinoline. |
| 5-α-chloroacetyl-6-fluoro-8-hydroxyquinoline | 1-methyl-3-(p-chlorophenyl)propylamine | 5-α-[1-methyl-3-(p-chlorophenyl)propylamino]acetyl-6-fluoro-8-hydroxyquinoline. |

EXAMPLE XII

1-[5-(8-hydroxyquinolyl)]-2-isopropyl-
aminoethanol

To a stired methanolic solution (1.1) containing 5-isopropylaminoacetyl - 8-hydroxyquinoline dihydrochloride (20.0 g., 0.057 M), cooled in an icebath, is added NaBH$_4$ (8 g.) over a 15 min. period. The solution is then allowed to stir at room temperature for 15 minutes whereupon conc. HCl (100 ml.) is then added. To the resulting mixture containing precipitated product is added an excess of ether to complete precipitation and the solids are filtered off and dried. These filtered solid salts are dissolved in 800 ml. of water, and 5 N NaOH solution is added slowly until a pH of 9.7–9.9 is reached. The free base which begins to precipitate is extracted 6 times with chloroform (100 ml.), said organic phase is separated and distilled under vacuum leaving a dark oil which is taken up in ethyl acetate and allowed to sit overnight. The yellow crystalline material is filtered to give 9 g. (60%) of product, M.P. 131–133° C.

*Analysis.*—Calc'd for $C_{14}H_{18}O_2N_2$: C, 68.27%; H, 7.37%; N, 11.37%. Found: C, 68.12%; H, 7.39%; N, 11.46%.

The free base so obtained is converted to the sulfate acid addition salt by treatment with 1 equivalent of H$_2$SO$_4$ in ethanol.

*Analysis.* — Calc'd for $C_{14}H_{18}O_2N_2 \cdot \frac{1}{2}H_2SO_4$: C, 56.94%; H, 6.49%; N, 9.49%. Found: C, 56.98%; H, 6.60%; N, 9.46%.

EXAMPLE XIII

1-[5-(8-hydroxyquinolyl)]-2-isopropylaminopropanol

The procedure of Example XII is repeated for the preparation of 1-[5-(8-hydroxyquinolyl)]-2-isopropylaminopropanol wherein a stoichiometric equivalent amount of 5-α-methylisopropylaminoacetyl-8-hydroxyquinoline dihydrochloride as prepared by the procedure of Example II is used in place of 5-isopropylaminoacetyl-8-hydroxyquinoline with comparable results.

EXAMPLE XIV

1-[5-(7-chloro, 8-hydroxyquinolyl)]-2-isopropylamino-
ethanol

The procedure of Example XII is repeated for the preparation of 1-[5-(7-chloro, 8-hydroxyquinolyl)]-2-isopropylaminoethanol wherein a stoichiometric equivalent amount of 5-isopropylaminoacetyl-7-chloro-8-hydroxyquinoline dihydrochloride as prepared by the procedure of Example III is used in lieu of 5-isopropylaminoacetyl-8-hydroxyquinoline with comparable results.

EXAMPLE XV

1-[5-(8-hydroxyquinolyl)]-2-ethylaminoethanol

The procedure of Example XII is repeated for the preparation of 1-[5-(8-hydroxyquinolyl)]-2-ethylaminoethanol wherein a stoichiometric equivalent amount of 5-ethylaminoacetyl-8-hydroxyquinoline dihydrochloride as prepared by the procedure of Example V is used in lieu of 5-isopropylaminoacetyl-8-hydroxyquinoline with comparable results.

EXAMPLE XVI

1-[5-(8-hydroxyquinolyl)]-2-t-butylaminoethanol

The procedure of Example XII is repeated for the preparation of 1-[5-(8-hydroxyquinolyl)]-2-t-butylaminoethanol wherein a stoichiometric equivalent amount of 5-t-butylaminoacetyl-8-hydroxyquinoline dihydrochloride as prepared by the procedure of Example VI is used in lieu of 5-isopropylaminoacetyl-8-hydroxyquinoline with comparable results.

EXAMPLE XVII

1-[5-(8-hydroxyquinolyl)]-2-cyclopentylaminoethanol

The procedure of Example XII is repeated for the preparation of 1-[5-(8-hydroxyquinolyl)]-2-cyclopentylaminoethanol wherein a stoichiometric equivalent amount of 5-cyclopentylaminoacetyl-8-hydroxyquinoline dihydrochloride as prepared by the procedure of Example VII is used in lieu of 5-isopropylaminoacetyl-8-hydroxyquinoline with comparable results.

EXAMPLE XVIII

1-[5-(8-hydroxyquinolyl)]-2-(2-p-methoxyphenyl)
ethylaminoethanol

The procedure of Example XII is repeated for the preparation of 1-[5-(8-hydroxyquinolyl)] - 2 - (2-p-methoxyphenyl)ethylaminoethanol wherein a stoichiometric equivalent amount of 5-(2-p-methoxyphenyl)ethylaminoacetyl-8-hydroxyquinoline dihydrochloride as prepared by the procedure of Example VIII is used in lieu of 5-isopropylaminoacetyl-8-hydroxyquinoline with comparable results.

EXAMPLE XIX

1-[5-(8-hydroxyquinolyl)]-2-(2-phenoxy)isopropyl-
aminoethanol

The procedure of Example XII is repeated for the preparation of 1-[5-(8-hydroxyquinolyl)] - 2 - (2-p-methoxyphenyl)ethylaminoethanol wherein a stoichiometric equivalent amount of 5-(2-phenoxy)isopropylaminoacetyl-8-hydroxyquinoline dihydrochloride as prepared by the procedure of Example IX is used in lieu of 5-isopropylaminoacetyl-8-hydroxyquinoline with comparable results.

EXAMPLE XX

1-[5-(8-hydroxyquinolyl)]-2-(4-phenyl-2-butyl)
aminoethanol

The procedure of Example XII is repeated for the preparation of 1-[5-(8-hydroxyquinolyl)]-2-(4-phenyl-2-butyl) aminoethanol wherein a stoichiometric equivalent amount of 5-(4-phenyl-2-butyl) aminoacetyl-8-hydroxyquinoline dihydrochloride as prepared by the procedure of Example X is used in lieu of 5-isopropylaminoacetyl-8-hydroxyquinoline with comparable results.

EXAMPLE XXI

1-[5-(8-hydroxyquinolyl)]-2-aminoethanol

The procedure of Example XII is repeated for the preparation of 1-[5-(8-hydroxyquinolyl)]-2-aminoethanol wherein a stoichiometric equivalent amount of 5-aminoacetyl-8-hydroxyquinoline dihydrochloride as prepared by the procedure of Example IV is used in lieu of 5-isopropylaminoacetyl-8-hydroxyquinoline with comparable results.

*Analysis.*—Cal'd for $C_{11}H_{12}O_2N_2 \cdot 2HCl$: C, 44.76%; H, 5.46%; N, 9.49%; Cl, 24.02%. Found: C, 44.81%; H, 5.45%; N, 9.19%; Cl, 23.73%.

EXAMPLE XXII

The procedure of Example XII is repeated wherein stoichiometric equivalent amounts of the dihydrochloride acid salts of the product compounds enumerated in Example XI are used in place of 5-isopropylaminoacetyl-8-hydroxyquinoline dihydrochloride and the corresponding hydroxy compounds are obtained in substantial yields.

EXAMPLE XXIII

1-[5-(8-hydroxy-1,2,3,4-tetrahydroquinolyl)]-2-isopropyl-
aminoethanol

A mixture containing 1-[5-(8-hydroxyquinolyl)]-2-isopropylaminoethanol (2.46 g., 0.01 M), PtO$_2$ (2.0 g.), and 70 ml. of an ethanol-acetic acid (10:1) mixture is hydrogenated until hydrogen uptake subsides. The resulting mixture is filtered and evaporated to dryness under vacuum. To this residue is added an ethanolic solution containing an equivalent amount of sulfuric acid followed by the addition of ether to precipitate the white crystalline sulfate salt. The product is filtered to give a 70% yield, M.P. 255–265° C. dec.

*Analysis.*—Calc'd for $C_{14}H_{22}O_2N_2 \cdot \frac{1}{2}H_2SO_4 \cdot \frac{1}{2}H_2O$: C, 54.52%; H, 7.84%; N, 9.09% Found: C, 54.68%; H, 7.85%; N, 8.87%.

disclosed herein may be converted to their acid addition salts in the following manner: to an ethanolic solution containing a 1-[5-(8-hydroxyquinolyl)]-2-aminoethanol or the corresponding 1,2,3,4-tetrahydro compound is added an equivalent amount of a suitable acid in ethanol. The salts so formed crystallize directly from the ethanolic solution. Ether may be added to finalize precipitation. Other suitable solvents, for example, methanol, water or mixtures thereof may be utilized. The following acid addition salts are typical examples prepared by the above said procedure and substantial yields of products are obtained:

A

| 1-[5-(8-hydroxyquinolyl)]-2-aminoethanol derivative | Acid | Acid Addition Salt |
|---|---|---|
| 1-[5-(8-hydroxyquinolyl)]-2-isopropylaminoethanol. | HCl | 1-[5-(8-hydroxyquinolyl)]-2-isopropylaminoethanol dihydrochloride. |
| 1-[5-(8-hydroxyquinolyl)-2-isopropylaminopropanol. | Tartaric Acid | 1-[5-(8-hydroxyquinolyl)]-2-isopropylaminopropanol tartrate. |

B

| 1,2,3,4-tetrahydro derivative | Acid | Acid Addition Salt |
|---|---|---|
| 1-[5-(8-hydroxy-1,2,3,4-tetrahydroquinolyl)]-2-isopropylaminoethanol. | HI | 1-[5-(8-hydroxyquinolyl)]-2-isopropylaminoethanol dihydroiodide. |
| 1-[5-(8-hydroxy-1,2,3,4-tetrahydroquinolyl)]-2-isopropylaminopropanol. | Tartaric Acid | 1-[5-(8-hydroxyquinolyl)]-2-isopropylaminopropanol tartrate. |

EXAMPLE XXIV

1-[5-(8-hydroxy-1,2,3,4-tetrahydroquinolyl)]-2-isopropylaminopropanol

The procedure of Example XXIII is repeated for the preparation of 1-[5-(8-hydroxy-1,2,3,4-tetrahydroquinolyl)]-2-isopropylaminopropanol wherein a stoichiometric equivalent amount of 1-[5-(8-hydroxyquinolyl)]-2-isopropylaminopropanol is used in place of 1-[5-(8-hydroxyquinolyl)] - 2 - isopropylaminoethanol and substantial amounts of the sulfate acid addition salt of product are obtained.

EXAMPLE XXV

1-[5-(8-hydroxy-1,2,3,4-tetrahydroquinolyl)]-2-aminoethanol

The procedure of Example XXIII is repeated for the preparation of 1-[5-(8-hydroxy-1,2,3,4-tetrahydroquinolyl)]-2-aminoethanol wherein a stoichiometric equivalent amount of 1-[5-(8-hydroxyquinolyl)]-2-aminoethanol is used in place of 1-[5-(8-hydroxyquinolyl)]-2-isopropylaminoethanol and substantial amounts of the sulfate acid addition salt of product are obtained.

EXAMPLE XXVI

The procedure of Example XXIII is repeated wherein stoichiometric equivalent amounts of the product compounds obtained by the procedures of Examples XIV, XV, XVI, XVII, XVIII, XIX, XX and XXII were used in place of 1-[5-(8-hydroxyquinolyl)]-2-isopropylaminoethanol and the corresponding 1,2,3,4-tetrahydro derivatives in the form of their sulfate addition salts are obtained in substantial yields.

EXAMPLE XXVII

The 1-[5-(8-hydroxyquinolyl)]-2-aminoethanols and the corresponding 1,2,3,4-tetrahydro compounds thereof

EXAMPLE XXVIII

The dihydrochloride, dihydrobromide, and dihydroiodide acid addition salts of those compounds obtained by the procedures of Examples XIV, XV, XVI, XVII, XVIII, XIX, XXI and XXII and their corresponding 1,2,3,4-tetrahydro derivatives are prepared following the procedure of Example XXVII with comparable results.

EXAMPLE XXIX

The ability of 1-[5-(8-hydroxyquinoyl)]-2-isopropylaminoethanol to antagonize the bronchoconstrictor effects of acetylcholine and histamine in intact guinea pigs is indicated by the method below in comparison with isoproterenol:

| Drug | Dose, μg./kg. i.v. | No. of animals | Average percent Inhibition of bronchoconstriction To 10 μg. histamine | To 25 μg. acetylcholine | Duration of action |
|---|---|---|---|---|---|
| Isoproterenol | 1.0 | 4 | 60 | 46 | 6–12 min. |
|  | 4.0 | 4 |  |  | 6–12 min. |
|  | 1,000.0 | 4 | 100 |  | 15 min. |
| 1-[5-(8-hydroxyquinolyl)]-2-isopropylaminoethanol sulfate. | 10 | 3 | 0 |  | No recovery in 40 min. |
|  | 100 | 1 |  | 4 |  |
|  | 1,000 | 4 | 81 | 85 |  |

The results indicate the increased duration of action with 1-[5-(8 - hydroxyquinolyl)] - 2 - isopropylaminoethanol sulfate in comparison to isoproterenol

EXAMPLE XXX

The test procedure of Example XXIX is repeated in order to determine the ability of 1-[5-(8-hydroxyquinolyl)]-2-isopropylaminopropanol and those compounds prepared by the method of Examples XIV, XV, XVI, XVII, XVIII, XIX, XXI and XXII and their corresponding 1,2,3,4-tetrahydro derivatives to inhibit bronchoconstriction and comparable results are obtained.

EXAMPLE XXXI

The ability of 1-[5-(8-hydroxyquinolyl)]-2-isopropylaminoethanol in reducing the severity of bronchoconstrictor effects of a histamine-aerosol spray in intact conscious guinea pigs was determined and the following results were obtained:

PROTECTION OF GUINEA PIGS FROM HISTAMINE-AEROSOL SPRAY

[10 guinea pigs per each treatment group]

| Exp. No. | Treatment s.c. | Time interval between treatment and histamine spray | Incidence of bronchoconstriction (within 1 minute of exposure to histamine spray) | Total Score |
|---|---|---|---|---|
| 1 | Saline, 1 ml./kg | 1 hour | 10/10 | 30 |
|  | 1-[5-(8-hydroxyquinolyl)]-2-isopropylaminoethanol, 2 mg./kg. | do | 1/10 | 2 |
| 2 | Saline, 1 ml./kg | do | 10/10 | 30 |
|  | 1-[5-(8-hydroxyquinolyl)]-2-isopropylaminoethanol, 0.5 mg./kg. | do | 3/10 | 5 |
| 3 | Saline, 1 ml./kg | do | 10/10 | 37 |
|  | 1-[5-(8-hydroxyquinolyl)]-2-isopropylaminoethanol, 0.25 mg./kg. | do | 10/10 | 23 |
| 4 | Saline, 1 ml./kg | 20 minutes | 10/10 | 38 |
|  | 1-[5-(8-hydroxyquinolyl)]-2-isopropylaminoethanol, 2 mg./kg. | do | 10/10 | 21 |

Guinea pigs were scored 0 to 4 on the basis of changes in gross respiratory movements as follows: 0—normal; 1—slightly deepened breathing; 2—labored breathing; 3—severely labored breathing and ataxia; 4—unconsciousness with or without convulsions. The above results indicate the effectiveness of 1-[5-(8-hydroxyquinolyl)]-2-isopropylaminoethanol in antagonizing histamine-induced bronchoconstriction.

EXAMPLE XXXII

The test procedure of Example XXXI is repeated to determine the ability of 1-[5-(8-hydroxyquinolyl)]-2-isopropylaminopropanol and those compounds prepared by the method of Examples XIV, XV, XVI, XVII, XVIII, XIX, XXI and XXII and their corresponding 1,2,3,4-tetrahydro derivatives to reduce bronchoconstrictor effects of a histamine-aerosol spray in intact conscious guinea pigs and comparable results are obtained.

What is claimed is:

1. A compound selected from the group consisting of those of the formulae:

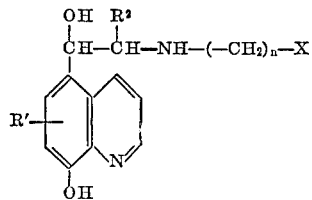

and

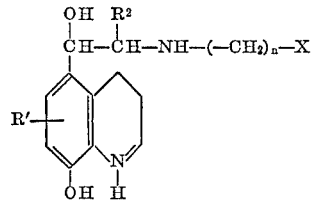

and the pharmaceutically-acceptable acid addition salts thereof, wherein R' is a member selected from the group consisting of H, alkyl of from 1 to 5 carbon atoms, halogen, hydroxy, methoxy, mercapto, amino, —SO$_3$H, and methanesulfonylamino; R$^2$ is selected from the group consisting of H, methyl, and ethyl; $n$ is an integer of from 0 to 10; and X is a member selected from the group consisting of H, phenyl, p-chlorophenyl, p-methoxyphenyl, phenoxy, p-chlorophenoxy, p-methoxyphenoxy, N-pyrrolidino, N-morpholino, N-(N'-methyl)piperazino, β-indolyl, 3,4-methylenedioxyphenyl and cycloalkyl containing from 3 to 7 carbon atoms provided that when $n$ is 0, X is hydrogen.

2. The compound 1-[5-(7-chloro, 8-hydroxyquinolyl)]-2-isopropylaminoethanol.

3. The compound 1-[5-(8-hydroxyquinolyl)]-2-isopropylaminoethanol.

4. The compound 1-[5-(8-hydroxyquinolyl)]-2-isopropylaminopropanol.

5. The compound 1-[5-(8-hydroxyquinolyl)]-2-ethylaminoethanol.

6. The compound 1-[5-(8-hydroxyquinolyl)]-2-t-butylaminoethanol.

7. A compound selected from the group consisting of those of the formulae:

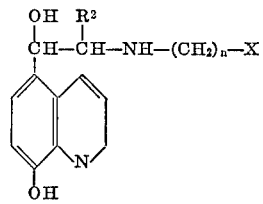

and

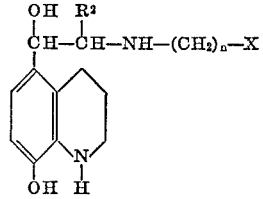

and the pharmaceutically-acceptable acid addition salts thereof, wherein R$^2$ is a member selected from the group consisting of H, methyl, and ethyl; $n$ is an integer of from 0 to 10; and X is a member selected from the group consisting of H, phenyl, p-chlorophenyl, p-methoxyphenyl, phenoxy, p-chlorophenoxy, p-methoxyphenoxy, N-pyrrolidino, N-morpholino, N-(N'-methyl)-piperazino, β-indolyl, 3,4-methylenedioxyphenyl and cycloalkyl containing from 3 to 7 carbon atoms provided that when $n$ is 0, X is hydrogen.

8. The compound 1-[5-(8-hydroxy-1,2,3,4-tetrahydroquinolyl)]-2-isopropylaminoethanol.

9. The compound 1-[5-(8-hydroxyquinolyl)]-2-cyclopentylaminoethanol.

10. The compound 1-[5-(8-hydroxyquinolyl)]-2-(2-p-methoxyphenyl)ethylaminoethanol.

11. The compound 1-[5-(8-hydroxyquinolyl)]-2-(2-phenoxy)isopropylaminoethanol.

12. The compound 1-[5-(8-hydroxyquinolyl)]-2-(4-phenyl-2-butyl)aminoethanol.

13. The compound 1-[5-(8-hydroxyquinolyl)]-2-aminoethanol.

14. The compound 1-[5-(8-hydroxy-1,2,3,4-tetrahydroquinolyl)]-2-aminoethanol.

References Cited

UNITED STATES PATENTS 3,215,732   12/1965   Stephenson _____ 260—570.5

FOREIGN PATENTS 1,013,224   12/1965   Great Britain.

ALEX MAZEL, *Primary Examiner.*

G. D. DAUS, *Assistant Examiner.*

U.S. Cl. X.R.

260—247.5, 268, 286, 289, 326.15, 326.85, 347.7, 690; 424—250, 258